United States Patent
Romeu Guardia

(10) Patent No.: US 7,185,610 B2
(45) Date of Patent: Mar. 6, 2007

(54) HEATED FLOORING MODULE FOR LIVESTOCK STABLES

(75) Inventor: Gener Romeu Guardia, Agramunt (ES)

(73) Assignee: Rotecna, S.A., Agramunt (ES)

( * ) Notice: Subject to any disclaimer, the term of this patent is extended or adjusted under 35 U.S.C. 154(b) by 0 days.

(21) Appl. No.: 10/866,793

(22) Filed: Jun. 15, 2004

(65) Prior Publication Data

US 2005/0028747 A1 Feb. 10, 2005

(30) Foreign Application Priority Data

Jun. 19, 2003 (ES) .................................. 200301429

(51) Int. Cl.
*A01K 1/00* (2006.01)
*F24F 1/00* (2006.01)
*F24F 7/07* (2006.01)

(52) U.S. Cl. .................. 119/448; 119/508; 119/525; 237/69; 165/53; 165/56; 165/49; 165/128; 52/220.4; 52/220.5

(58) Field of Classification Search ................ 119/436, 119/448, 508, 518, 528, 303, 308, 310, 312, 119/313, 314, 318, 320, 525; 237/69, 43; 165/56, 53, 49, 168, 169, 128; 52/220.4, 52/220.5; 454/185
See application file for complete search history.

(56) References Cited

U.S. PATENT DOCUMENTS

| | | | | |
|---|---|---|---|---|
| 1,044,605 A * | 11/1912 | Tolman | ....................... | 119/303 |
| 2,184,113 A * | 12/1939 | Calafati | ....................... | 165/56 |
| 2,205,001 A * | 6/1940 | Timmis et al. | ............... | 237/1 R |
| 2,799,481 A * | 7/1957 | Becker | ........................ | 165/171 |
| 3,809,014 A * | 5/1974 | Jones et al. | .................. | 119/508 |
| 3,815,550 A * | 6/1974 | Becker | ........................ | 119/508 |
| 4,217,859 A * | 8/1980 | Herring | ....................... | 119/508 |
| 4,646,814 A * | 3/1987 | Fennesz | ....................... | 165/56 |
| 5,078,203 A * | 1/1992 | Shiroki | ........................ | 165/56 |
| 5,456,209 A * | 10/1995 | Heinrich | ..................... | 119/450 |
| 5,636,527 A * | 6/1997 | Christensen et al. | .......... | 62/476 |
| 5,788,152 A * | 8/1998 | Alsberg | ....................... | 237/69 |
| 5,860,471 A * | 1/1999 | Perryment et al. | .......... | 165/170 |
| 5,937,793 A * | 8/1999 | Church | ....................... | 119/528 |
| 5,957,378 A * | 9/1999 | Fiedrich | ...................... | 237/69 |
| 6,047,663 A * | 4/2000 | Moreau et al. | ............. | 119/529 |
| 6,095,235 A * | 8/2000 | Kongsgaard | ................. | 165/56 |
| 6,112,482 A * | 9/2000 | Wright et al. | .............. | 52/220.4 |
| 6,269,598 B1 * | 8/2001 | Wintermantel | ............. | 52/220.1 |

(Continued)

FOREIGN PATENT DOCUMENTS

| | | | |
|---|---|---|---|
| DE | 20203466 U | * | 3/2002 |
| EP | 0551226 A1 | * | 1/1993 |
| EP | 1488692 A2 | * | 6/2004 |

(Continued)

*Primary Examiner*—Andrea M. Valenti
(74) *Attorney, Agent, or Firm*—Sughrue Mion, PLLC

(57) ABSTRACT

A heated flooring module is provided for livestock stables, which includes an upper plaque, for walking on, which is essentially level; a hollowed central section, with no bottom surface, whose upper surface is equipped with at least one continuous runnel, adapted to contain a heat source that enters and exits the runnel through respective entry and exit tubular segments, with the abovementioned hollowed central section equipped with suspension elements for being suspended from resistant elements such as the bars of a horizontal grid; and an optional under-lid, all of the above arranged in such a way that, when the upper plaque is welded to the upper surface of the hollowed central section, the continuous runnel forms an enclosed circuit which contains the heat source inside, leaving the under-lid fitted into the underside of the hollowed central section.

23 Claims, 3 Drawing Sheets

U.S. PATENT DOCUMENTS

| | | | | |
|---|---|---|---|---|
| 6,622,652 B1 | * | 9/2003 | Wang | 119/28.5 |
| 6,752,203 B2 | * | 6/2004 | Kurita | 165/169 |
| 2002/0124842 A1 | * | 9/2002 | Fukutake et al. | 126/680 |

FOREIGN PATENT DOCUMENTS

| | | | | |
|---|---|---|---|---|
| JP | 57070330 A | * | 4/1982 |
| JP | 60164139 A | * | 8/1985 |

* cited by examiner

HEATED FLOORING MODULE FOR LIVESTOCK STABLES

TECHNICAL SECTOR OF THE INVENTION

The invention refers to a heated flooring module for livestock stables, of the type that is equipped with means for being suspended from resistant supports such as the bars of a horizontal grid and which, together with other adjacent interlocking modules, constitutes the floor level of a farm or similar.

BACKGROUND TO THE INVENTION

At present, for building livestock stable flooring, different types of moulded pieces are produced, which can be suspended from a gridwork of resistant supports to form an intermediate level that livestock can walk over and below which the liquids and waste that are eliminated from the surface, such as wash water or liquid manure, can flow.

In order to provide a surface that is at an appropriate temperature for the livestock to rest on, the moulded pieces are fitted with hot water heating, although some pieces are designed to be fitted with electrical heating. To provide these types of floors with heating entails that in fact, each unit of flooring or module is comprised of a number of moulded or injected sections that conveniently interlock.

Patent document ES 2144434 describes a moulded piece or flooring module, which comprises a first section in the shape of a hollow tray, equipped with means for being suspended from a grid and acting as the support for a moulded section that houses the heating components inside designed with a suitable surface for animals to walk on. An insulating plaque is fitted between the moulded section and the hollow tray in order to thermally insulate the heating system.

If the heating system uses hot water, the moulded section incorporates a moulded tubular casing beneath the transit surface through which the hot water can flow.

One of the first disadvantages of this type of design is that the entire moulded section has to be changed according to the type of heating system used, because it is different if using hot water or electricity, and this means that different moulds have to be cast in order to produce different types of pieces.

Secondly, this type of design has the disadvantage that the waste waters that are eliminated from the transit surface can seep through the joint between the moulded section and the support tray, giving rise to dampness and other types of problems, including the fact that the chemical agents in the wash water can produce a potential focus for bacteria as well as potentially damaging the insulating plaque fitted above the module's bottom tray.

According to the moulded piece described in patent ES 2144434, the joint between the moulded section and the tray is not totally watertight, despite all of the measures taken to this effect. In fact, to avoid liquids from settling at the bottom, the tray is designed with a suitable shape for liquids to flow towards the centre, from which it is evacuated through small holes.

Because the installations have to be as aseptic as possible, the fact that liquids can seep inside the module is a serious problem, which the abovementioned design and other ones known to date, cannot resolve.

Another aspect for improvement is that the tubular casing uses specially manufactured pieces that require welding because their complicated design means that it is impossible to manufacture such pieces by injection. The use of injected plastic pieces or shapes would improve the characteristics and performance of the module, because injected plastic pieces are more compact and consequently, have more sealed pores. By using injected pieces, the contamination of the circuit and the wearing of the installations as a result of the gases emitted by liquid manure, faeces and other chemical products, would become much more difficult.

Therefore, the lack of a module that can guarantee watertight sealing, which can also heat the surface using either water or electricity and at the same be of easier manufacture to the extent that it can be made by injection, becomes apparent.

EXPLANATION OF THE INVENTION

The object of the invention is a heated flooring module for livestock stables of the type that is equipped with means for being suspended from resistant supports such as the bars of a horizontal grid and which, together with other adjacent interlocking modules, constitutes the floor level of a farm or similar.

Essentially, the heated flooring module is characterised by the fact that it comprises a top plaque, for walking on, which is essentially level; and a hollowed central section with no bottom surface, whose upper surface is moulded to contain at least one continuous runnel adapted to enclose the heating means that enter and exit the runnel through corresponding tubular segments designed for the entry and exit of the heating devices, with the hollowed central section being fitted with the appropriate means for its suspension. All of the above arranged in such a way that when the upper plaque is welded onto the top surface of the hollowed central section, the runnel provides an enclosed circuit, which contains the heating devices.

Following a preferable design, the heating method would consist of a heating fluid, which would circulate inside the closed section conduit that is formed by the enclosure between the upper plaque and the hollow central section.

Following a preferable design, where the enclosed conduit communicates with the tubular segments its section would abruptly diminish at a point adjacent to the tubular segments.

Another preferable form of production would entail the heating method comprising at least one electrical resistance.

According to another characteristic of the invention, the hollowed central section would be covered underneath by closing devices.

In a preferable design, the closing device would consist of an under-lid that can be fitted to the lower half of the hollowed central section.

It is also characteristic of the module that, in the interlocked position, the under-lid is contained within the hollowed central section and its edges rest on the internal surface of the central section's walls.

According to another characteristic of the invention, one of the hollowed central section's side walls is given a perforation and its opposite wall is given corresponding projections so that when the adjoining walls of two modules are opposite each other, the first module's projections slot into the second module's perforations; the perforation on the side wall also forms the entry point for a drainage tube, designed to expel through the under-lid, any liquid that might seep through the perforation in the side wall.

BRIEF DESCRIPTION OF THE DRAWINGS

The attached drawings show, by way of a non-restrictive model, a preferred design for the heated flooring module for livestock stables that is the object of this invention. In these drawings.

DETAILED DESCRIPTION OF THE DRAWINGS

Figure 1:
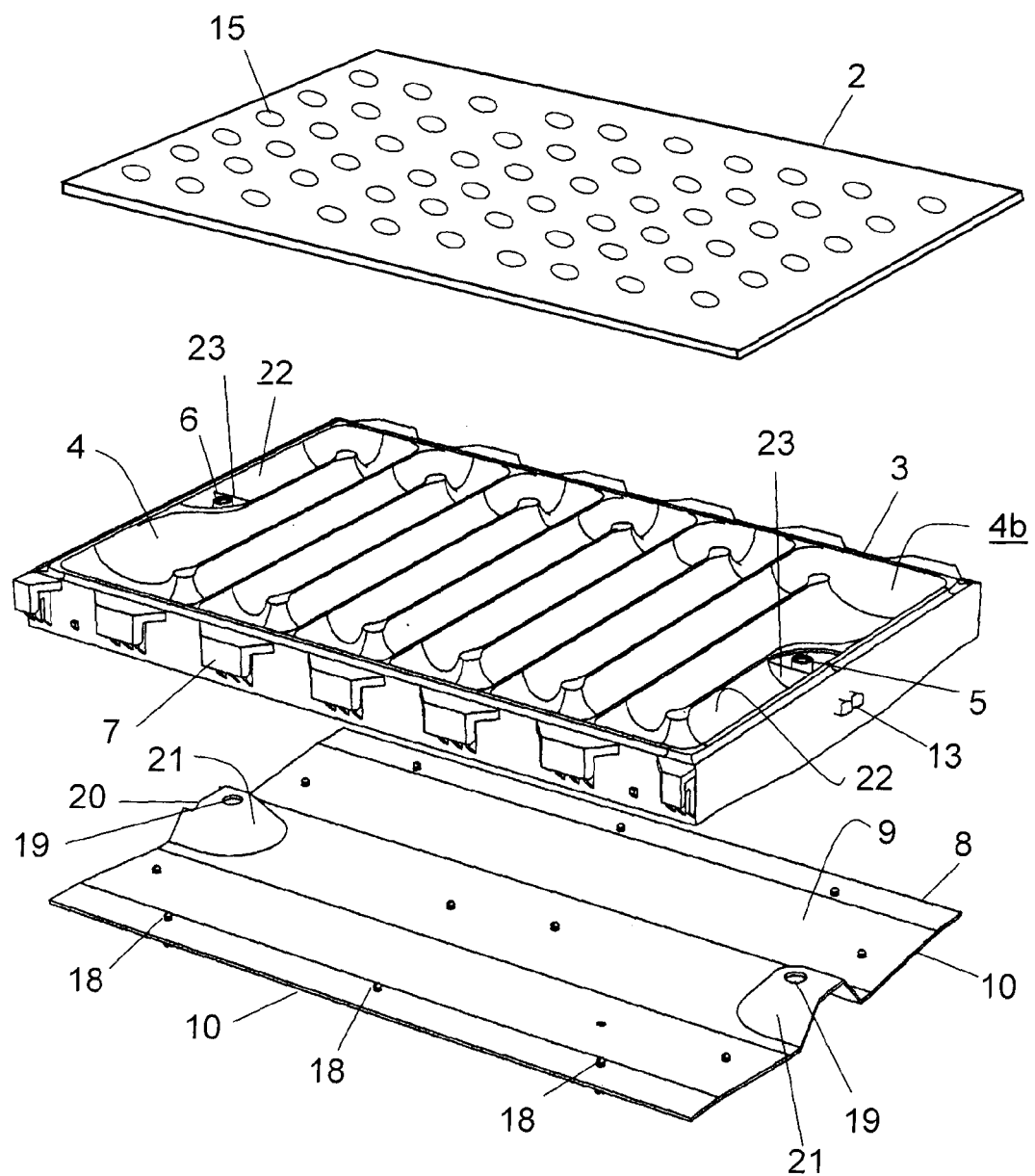
FIG. 1, is a view in perspective of the invention's heated flooring module, with its three separate components in their corresponding assembly position.

The description below refers to the drawings explained above, which allow us to appreciate in detail the different components that make up the invention's heated flooring module for livestock 1 which, as shown in FIG. 1, consists of an upper plaque 2, a hollowed central section 3 and an under-lid 8.

In FIG. 1's design model, the hollowed central section 3 presents an essentially straight rectangular parallelepipedic form with no bottom surface and with an upper surface that contains a runnel 4 suited for casing a heating device that would preferably consist of a heating fluid. This runnel 4 comprises straight adjacent stretches that are transversally arranged and joined at each alternative end by respective curvilinear stretches 4b. This arrangement is optimal for channelling the heating fluid, which would enter runnel 4 through the initial tubular segments 5 or 6, fitted in the middle of the longitudinal end of hollowed central section 3, and exit through the second tubular segment 6 or 5 that is provided opposite the point of entry.

Alternatively, on the same upper surface of hollowed central section 3, heating devices consisting of electrical resistances can be fitted, which can be housed inside the runnel 4 of the hollowed central section, with the terminal connections passing through tubular segments 5 and 6.

Upper plaque 2 is designed for welding onto the top surface of the hollowed central section 3 so that the two form an enclosed conduit that will contain the chosen heating method.

Effectively, in the event of using a heating method such as hot water, when the upper plaque 2 is welded onto the hollowed central section 3, runnel 4 defines a conduit through which the hot water can flow, flowing through the circuit thanks to the pressure with which it is introduced through the first tubular segment 5 or 6. The hot water acts as a source of heat, which radiates outside through plaque 2. The same happens in the event of using an electrical heating device consisting for example of electrical resistances.

To avoid the potential accumulation of gases inside the conduit, the rectilinear stretches 22 of runnel 4 of the hollowed central section, are equipped with corresponding partitions 23. These partitions 23 are arranged as an overflow, transversally across the stretches of runnel 4, but without managing to totally close off the section of the circuit that forms between runnel 4 and the upper plaque 2, and force the fluid to flow over them by changing the fluid's pressure where the circuit section decreases.

In the direction of the fluid's circulation in the conduit, partition 23 of the last rectilinear stretch 22 of the runnel through which the heating fluid flows, is fitted immediately prior to the tubular segment through which the heating fluid is expelled. The upper mouth of the tubular segment 5/6 is also situated at a higher level than partition 23, or overflow, helping not only to expel the fluid, but also the gases that may be circulating inside the conduit, because a vacuum is created as a depression occurs in the fluid flow downstream of partition 23. In this way, the circuit's drainage is ensured and the accumulation of gas bubbles inside the circuit is avoided, favouring heat transmission.

Figure 5:
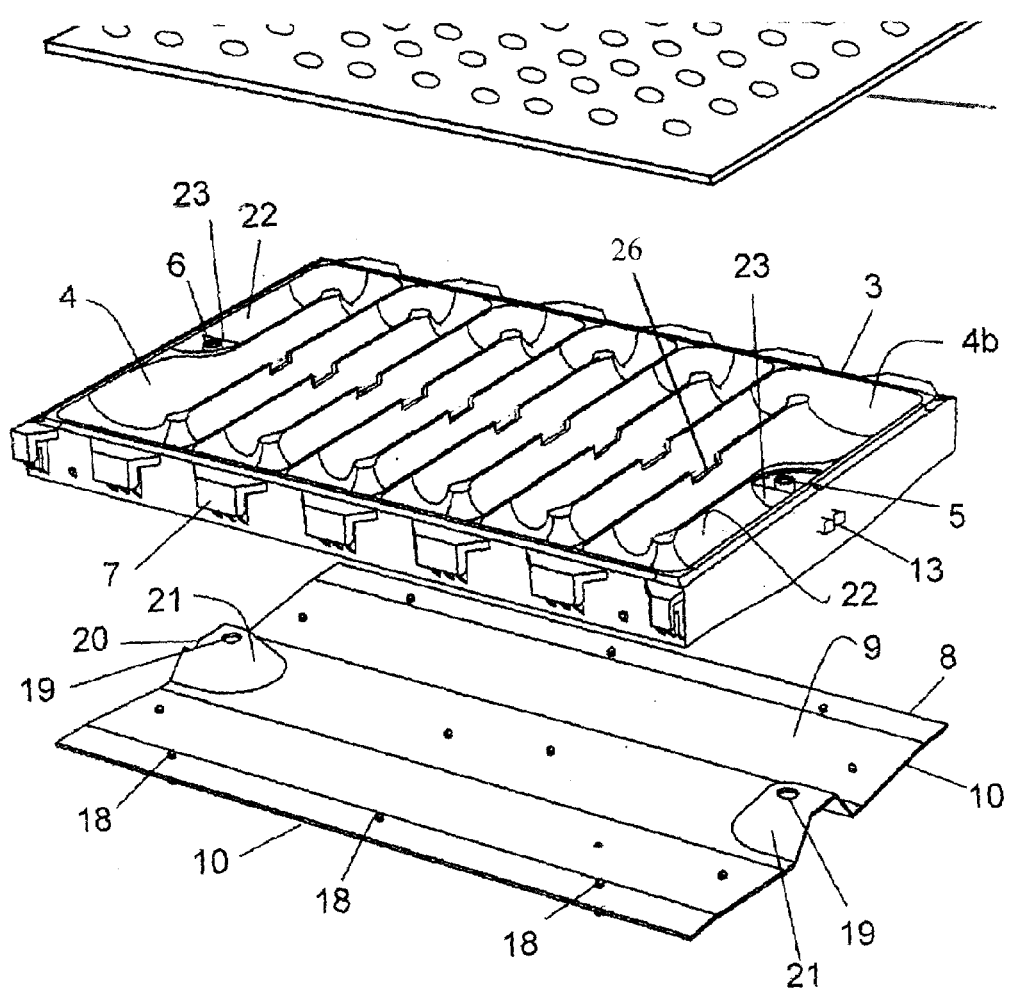
FIG. 5 is a perspective view of another embodiment of the heated flooring module.

At the same time, as shown in FIG. 5, it is envisaged that the side walls of runnel 4 will be given perforations 26 that will provide communication between the adjacent rows of the runnel, through which the gases that are inside the circuit can flow, easing their movement in the direction of the tubular exit segment 5 or 6.

By welding the seal of plaque 2, the leakage of water or liquids that may accumulate on plaque 2 is avoided, because following a preferable method of production the plaque is joined to hollowed central section 3 by spot-welding.

On its outer surface, plaque 2 is fitted with a series of protrusions or a relief 15, designed to prevent the animals walking on the surface from slipping because of the liquids or other waste that may accumulate on it. The plaque can be made with indentations if appropriate to interlock with the protrusions.

In the same way, the outer surface of plaque 2 can present a certain slope in relation to the horizontal to ease the expulsion of liquids through gravity from the transit surface.

To avoid unnecessary heat loss, module 1 of the example also comprises an under-lid 8 that fits under the bottom of the hollowed central section 3. This under-lid 8, in its fitted position, is introduced inside the main body in such a way that its edges 10 rest on the inner surface 11 of the walls of the hollowed central section 3.

In this way, liquids flowing on the transit surface and that fall on the external surface of the walls of main section 3 cannot seep inside the central section, because as they touch the outer surface of the walls, the liquid will fall through the action of gravity onto the immediately lower level.

Figure 2:
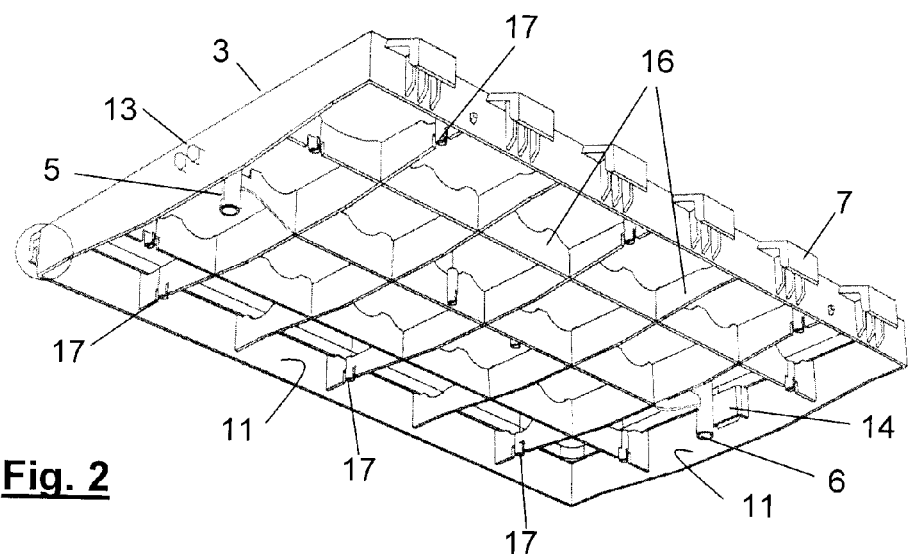
FIG. 2, is a view in perspective of the lower half of the hollowed central section shown in FIG. 1.

FIG. 2 shows how the hollowed central section 3 does in fact have no bottom surface. However, it does have a series of partitions 16 that cross sideways and lengthways with the object of improving the mechanical resistance of the hollowed central section 3, on account of the fact that is must be able to withstand the weight of livestock.

By fitting the under-lid 8 under the hollowed central section 3, an air chamber is created between the under-lid and the bottom half of the abovementioned hollow section. The air contained inside this chamber will find it difficult to escape because, given its temperature, it will have a tendency to rise and the chamber has no exit to the outside from its top. By not having to renew this volume of hot air, the module's heat loss through its lower half is avoided to a great extent, because, as opposed to other known designs, it is not necessary to fit a layer of reflecting material under the heating means to avoid heat loss from under the module.

To fit the under-lid 8, the hollowed central section 3 is fitted with a series of casings 17, suitably distributed across its lower half. These casings interlock with corresponding projections 18 located on the upper surface 9 of the under-lid 8. In the interlocked position, projections 18 fit into the housings 17 by means of pressure, involving the under-lid 8 interlocking with the hollowed central section 3.

In the same way, although this is not shown in the drawings, the internal surface 11 of the walls of the hollowed central section 3 can be given a continuous or discontinuous step-shaped notch, designed to support the edges of the under-lid 8.

The longitudinal ends of under-lid 8 in their central sections present elevated dome-shaped sections 21 fitted with a perforation 19, through which the tubular segments 5 and 6 project when the under-lid 8 is fitted to the hollowed central section 3.

Figure 3:
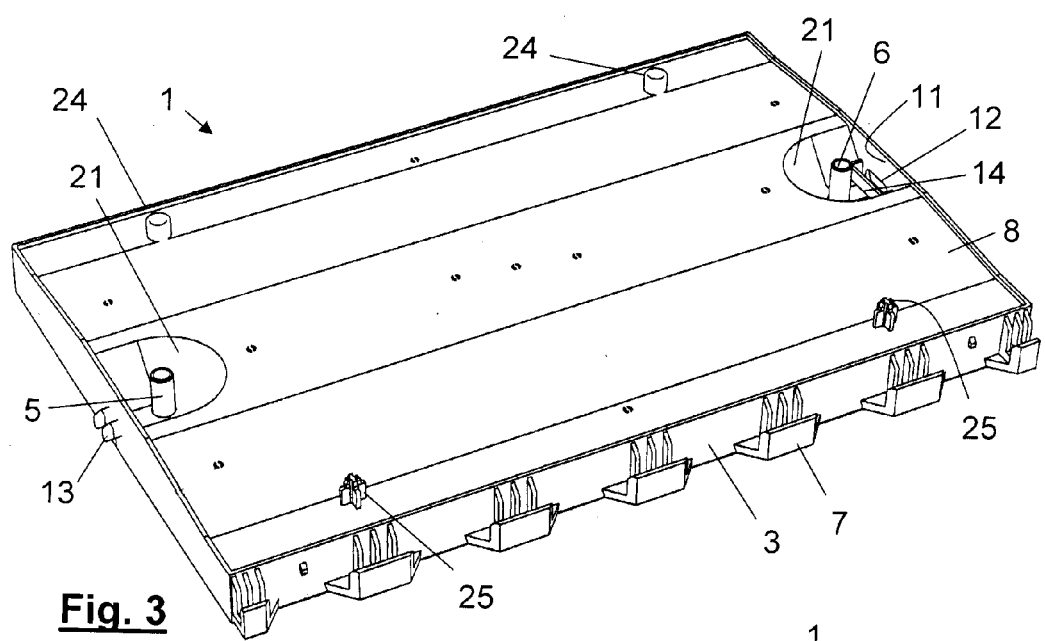
FIG. 3, is a view in perspective of the lower half of the heated module shown in FIG. 1, showing a close-up of the of the interlocking between the under-lid and the hollowed central section.

FIG. 3 shows a module 1 in which the under-lid 8 is fitted to the hollowed central section 3, and from which we can see how tubular segments 5 and 6 pass through the under-lid 8 through the perforations 19 laid in domes 21.

FIG. 1 shows how one of the domes 21 also has a notch 20 fitted in a side wall of the hollowed central section 3 so that a drainage tube 14 (FIGS. 2 and 3) can evacuate any liquid that may seep through the perforation designed for the modules' interlocking.

Indeed, as shown in FIGS. 1 and 3, one of the side walls of the hollowed central section 3 is fitted with perforations 12 and its opposite wall is fitted with corresponding projections 13 for interlocking. When two modules are arranged side by side, the first module's wall with perforations 12 is opposite the second module's wall with projections 13, which are introduced through the perforation 12 in the wall of the adjacent module interlocking both modules together, eliminating any vertical or horizontal movement between the two modules.

The hollowed central section 3 is provided with an appropriate suspension fitting 7, consisting of angular hooks that allow the module to rest on a horizontal grid. The details of the suspension fitting 7 can be omitted from this description because it is a common design.

Figure 4:
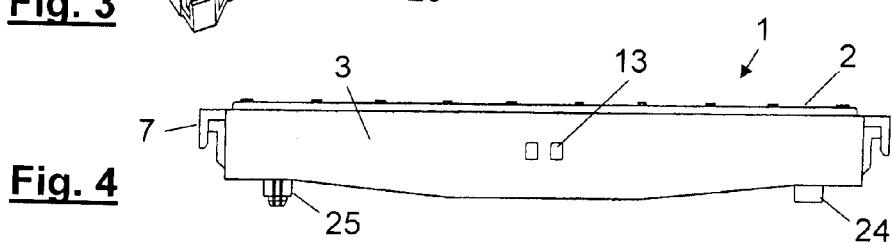
FIG. 4, is an elevated frontal view of the FIG. 1 module assembled together.

As FIGS. 3 and 4 show, the under-lid 8 of module 1 that is the object of the invention is moreover provided on its underside with linking devices that consist of two small cylindrical formations 24 and two corresponding casings 25 fitted directly opposite the abovementioned cylindrical formations, and these linking devices, both cylindrical formations and casings are situated at the same distance from the nearest corner of the under-lid, so that when two modules are placed opposite on their under-lid 8 and one is rotated 180° in respect of the other, the casings 25 of the first module interlock with the cylindrical formations 24 of the second module, at the same time as the casings of the second module house the cylindrical formations of the first, making it easier to stack the modules 1 in twos, thus improving the modules' transport or storage operations.

It is worth noting that another alternative to avoid heat loss consists in covering the underside of the runnel in the hollowed central section 3 with any form of insulating material.

The invention claimed is:

1. A heated flooring module (1) for livestock stables, which is equipped with suspension members for suspending the heated flooring module from resistant supports of a grid and which, together with other adjacent interlocking modules, constitutes the floor level of a farm, comprising:
    (a) an upper plaque (2), for transit, which is level; and
    (b) a hollowed central section (3), with no bottom surface, whose upper surface is fitted with at least one continuous runnel (4) of adjacent stretches open at the upper surface of the hollowed central section, the at least one continuous runnel (4) containing a heat source, that enters and exits the runnel through relevant tubular segments of entry (5 or 6) and exit (6 or 5) for the heat source, with the hollowed central section equipped with the suspension members (7), all of the above arranged in such a way that, when the upper plaque (2) is welded to the upper surface of the hollowed central section (3), the at least one continuous runnel (4) forms an enclosed circuit which contains the heat source inside;
wherein the flooring module further comprises an under-lid (8) fitted to an underside of the hollowed central section, said under-lid containing elevated dome shaped sections fitted with perforations through which the tubular segments of entry and exit pass though the under-lid respectively in communication with the continuous runnel.

2. The heated flooring module according to claim 1, wherein the heat source comprises a heating fluid, which circulates through the enclosed circuit that forms between the upper plaque and the hollowed central section.

3. The heated flooring module according to claim 2, wherein a section of stretches (22) of the enclosed circuit where it communicates with the tubular segments (5, 6) is abruptly diminished at a point adjacent to the said tubular segments.

4. The heated flooring module according to claim 1, wherein the heat source comprises at least one electrical resistance.

5. The heated flooring module according to any one of claims 1–4, wherein the hollowed central section (3) is covered on its underside with closing devices.

6. The heated flooring module according to claim 5, wherein the closing devices consist of said under-lid (8) that is fitted to the underside of the hollowed central section (3).

7. The heated flooring module according to claim 6, wherein, in a coupled position, the under-lid (8) is introduced inside the central section (3), and wherein edges (1) of the under-lid rest on an inner surface (11) of the walls of the central section.

8. The heated flooring module according to claim 1, wherein the hollowed central section (3) is equipped, in one of its side walls, with a perforation (12) and on its opposite wall, with corresponding projections (13), so that when the adjacent walls of two modules (1) are opposite each other, the projections of the first module fit through the perforation of the second module, and wherein the perforation in the side wall forms the entry point for a drainage tube (14) provided on the side wall having the perforation such that the drainage tube expels out through the under-lid (8) any liquid that seeps through said perforation when the projections of the first module are inserted into the perforations the second module.

9. The heated flooring module according to claim 1, wherein the hollowed central section includes a series of partitions which form a grid below said at least one continuous runnel.

10. The heated flooring module according to claim 1, wherein the at least one continuous runnel comprises adjacent stretches which are transversally arranged and joined at each alternative end by respective curvilinear stretches.

11. The heated flooring module according to claim 10, wherein the adjacent stretches of the at least one continuous runnel include side wall openings which provide communication between adjacent rows of the at least one continuous runnel at locations other than the curvilinear stretches.

12. The heated flooring module according to claim 10, wherein every two adjacent stretches have at least a portion of their side wall in common.

13. The heated flooring module according to claim 1, wherein the upper plaque encloses the open adjacent stretches of the continuous runnel when the upper plaque is welded to the upper surface of the hollowed central section.

14. A heated flooring module, comprising:
a central section, and a continuous runnel fitted to an upper surface of the central section,
wherein the continuous runnel is open at the upper surface of the central section and connects segments of entry and exit,
an upper plaque attached to the upper surface of the central section, wherein the continuous runnel contains a heat source that enters and exits the runnel through tubular segments of entry and exit for the heat source,
wherein the continuous runnel comprises adjacent stretches that are transversally arranged and joined at each alternative end by respective curvilinear stretches,
wherein the adjacent stretches of the continuous runnel include side wall openings that provide communication between adjacent rows of the runnel at locations other than the curvilinear stretches, wherein the flooring module further comprises an under-lid fitted to an underside of the central section, said under-lid containing elevated dome shaped sections fitted with perforations through which the tubular segments of entry and exit pass through the under-lid respectively in communication with the continuous runnel.

15. The heated flooring module according to claim 14, wherein the heat source comprises a heating fluid, which circulates through the enclosed circuit that forms between the upper plaque and the central section.

16. The heated flooring module according to claim 14, wherein a section of the adjacent stretches of the enclosed circuit where it communicates with the tubular segments is abruptly diminished at a point adjacent to the said tubular segments.

17. The heated flooring module according to claim 14, wherein the heat source comprises at least one electrical resistance.

18. The heated flooring module according to claim 14, wherein the central section is a hollowed central section that includes a series of partitions which form a grid below said continuous runnel.

19. The heated flooring module according to claim 18, wherein the hollowed central section further comprises said under-lid that is fitted to the underside of the hollowed central section below the grid.

20. The heated flooring module according to claim 14, further comprising suspension members that suspend the heated flooring module, wherein the heated flooring module together with other adjacent modules form a floor.

21. The heated flooring module according to claim 20, wherein said upper plaque is welded to said central section such that said plaque seals the runnel to form an enclosed circuit.

22. The heated flooring module according to claim 14, wherein the continuous runnel and the upper plaque attached to the upper surface of the central section forms an enclosed circuit.

23. The heated flooring module according to claim 14, plaque is attached to the upper surface of the central section to form an enclosed circuit which contains the heat source inside, and wherein the upper plaque encloses the open adjacent stretches of the continuous runnel when the upper plaque is attached.

* * * * *